United States Patent
Iwase (10) Patent No.: US 7,801,918 B2
(45) Date of Patent: Sep. 21, 2010

(54) FILE ACCESS CONTROL DEVICE, PASSWORD SETTING DEVICE, PROCESS INSTRUCTION DEVICE, AND FILE ACCESS CONTROL METHOD

(75) Inventor: Kazuhisa Iwase, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 204 days.

(21) Appl. No.: 11/565,704

(22) Filed: Dec. 1, 2006

(65) Prior Publication Data
US 2007/0233687 A1 Oct. 4, 2007

(30) Foreign Application Priority Data
Mar. 29, 2006 (JP) ............... 2006-091910

(51) Int. Cl.
*G06F 7/00* (2006.01)
(52) U.S. Cl. ............... 707/785; 707/705; 707/736; 707/783; 713/182; 713/183; 713/184; 726/26; 726/27; 726/28
(58) Field of Classification Search ............... 707/1, 707/2, 9, 10, 705, 736, 783, 785; 713/182, 713/183, 184; 726/26, 27, 28
See application file for complete search history.

(56) References Cited

U.S. PATENT DOCUMENTS
6,275,825 B1 * 8/2001 Kobayashi et al. ............ 707/9
2006/0200867 A1 * 9/2006 Yoshida .................... 726/27

FOREIGN PATENT DOCUMENTS
| JP | 2002-149603 | 5/2002 |
| JP | 2002-183091 | 6/2002 |
| JP | 2002-193091 | 6/2002 |
| JP | 2003-242035 | 8/2003 |
| JP | 2004-206636 | 7/2004 |

OTHER PUBLICATIONS

Adobe Systems Incorporated, "Adobe Acrobat 7.0 Professional", copyright 2004, 793 pages <http://www.acrobatusers.com/auc/content/tutorials/id_1778/ACROHELP.PDF>.*

* cited by examiner

*Primary Examiner*—Hung Q Pham
(74) *Attorney, Agent, or Firm*—Gauthier & Connors LLP (57) ABSTRACT

A file access control device included in a file management system having a storage unit has an access control management unit that controls access to the storage unit or to a file for which an access is requested while checking a file access right referring to access right information which is set for the storage unit and for each file stored in the storage unit, an access right setting processor that sets, when a file is read from the storage unit and transmitted in response to a file acquisition request when access is permitted by the access control management unit, to a file to be transmitted, an access right based on an access right which is set for the storage unit and an access right which is set for the file and adds, to the file, access right information, and a transmission processor that transmits the file.

9 Claims, 6 Drawing Sheets

Fig. 1

| DOCUMENT LIST SCREEN | | | |
|---|---|---|---|
| ☐ SHARED/ ☐ MANAGEMENT UNIT | | | |
| DOCUMENT NAME | NUMBER OF PAGES | DOCUMENT SIZE | |
| DOCUMENT1.pdf | 3 | 50kbytes | EDIT |
| DRAWING DATA1.pdf | 1 | 220kbytes | EDIT |
| TEXT DOUCMEN1.pdf | 2 | 512kbytes | EDIT |
| DOCUMENT2.pdf | 5 | 800kbytes | EDIT |

RELEASING PASSWARD: ******  APPLY

ACCESS RIGHT:
- READ: Role1    PERMITTED    CHANGE
- PRINT: Role1   PERMITTED    CHANGE
- EDIT: —        NOT PERMITTED  CHANGE
- ANNOTATION: — PERMITTED    CHANGE

PROTECTION PASSWARD DETAIL — 52

Fig. 3

PROTECTION PASSWARD SETTING

PROTECTION PASSWARD: ******

TYPE PASSWARD:

NUMERICAL PASSWARD: ******

SPECIAL KEY PASSWARD: ******

VOICE PASSWARD:

DESIGNATION OF USED PASSWARD FOR DIFFERENT CLIENTS:

ADD

| CLIENT | PASSWORD TYPE |
|---|---|
| 192.168.0.119 : | SPECIAL KEY |
| 192.168.0.110 : | VOICE |
| (PRINTER): | NUMERICAL |

```
DOCUMENT LIST SCREEN

[] SHARED/ [] MANAGEMENT UNIT        DOCUMENT
                                      SIZE
 [ACQUIRE
  COLLECTIVELY]  O PRIORITY ON RIGHT FOR GROUP  PASSWORD TYPE: [ — ▼]

DOCUMENT          NUMBER OF          DOCUMENT
       NAME              PAGES              SIZE

[✓]  DOCUMENT1.pdf       3                 50kbytes        [EDIT]
 [✓]  DRAWING DATA1.pdf   1                 220kbytes       [EDIT]
 [✓]  TEXT DOUCMEN1.pdf   2                 512kbytes       [EDIT]
 [ ]  DOCUMENT2.pdf       5                 800kbytes       [EDIT]
```

| PRINT INSTRUCTION SCREEN | | | |
|---|---|---|---|
| PRINTING PRINTER: | PrinterA ▼ | | |
| PAPER SIZE: | AUTOMATIC SELECTION ▼ | | |
| NUMER OF PAGES: | 1 | | DETAIL SETTING |
| USER ID: | User1 | DOCUMENT PASSWARD: | NOT DESIGNATED |
| PASSWARD: | ****** | | |
| DATA TO BE PRINTED (URL) | | | |
| DOCUMENT1.pdf http://dataserver/data1/EDOUIEF DRAWING DATA1..pdf http://dataserver/data1/EQCUI DOCUMENT2.pdf http://dataserver/data1/EaAE#F | | | |

Fig. 8

| DOCUMENT LIST SCREEN | | | | |
|---|---|---|---|---|
| 🗀 SHARED/ 🗀 MANAGEMENT UNIT | | DOCUMENT SIZE | | |
| ACQUIRE COLLECTIVELY | ○PRIORITY ON RIGHT FOR GROUP | PASSWORD TYPE: | — ▼ | 55 |
| DOCUMENT NAME | NUMBER OF PAGES | DOCUMENT SIZE | — NUMERICAL SPECIAL KEY VOICE | |
| ✓ DOCUMENT1.pdf | 3 | 50kbytes | | |
| ✓ DRAWING DATA1.pdf | 1 | 220kbytes | EDIT | |
| ✓ TEXT DOUCMEN1.pdf | 2 | 512kbytes | EDIT | |
| ☐ DOCUMENT2.pdf | 5 | 800kbytes | EDIT | |

Fig. 9

FILE ACCESS CONTROL DEVICE, PASSWORD SETTING DEVICE, PROCESS INSTRUCTION DEVICE, AND FILE ACCESS CONTROL METHOD

PRIORITY INFORMATION

This application claims priority to Japanese Patent Application No. 2006-091910, filed on Mar. 29, 2006.

BACKGROUND

1. Technical Field

The present invention relates to a file management system, and in particular, to management and use of a file when an access right is set for each of various files and file storage devices.

2. Related Art

In recent years, with networking of systems becoming widespread, security management of electronic data files cannot be neglected. Therefore, attempts have been made to improve security such as, for example, setting a password in a database and requiring input of a password when the database is accessed. In addition, because a password can be set for each file in a file format such as PDF (Portable Document Format), a password may be set for each file. With this configuration, it is possible to require input of a password when the file is accessed even after the user successfully logs in the database, thus further improving the security. In this manner, in recent years, unauthorized access has been more reliably prevented by managing database servers and the files with passwords, similar to logging into a computer system, and more specific setting for access control can be realized.

In the related art, although the security can be improved with the setting of a password, when, for example, multiple document files are to be printed collectively through a batch process or the like, the input of the password would be required each time a document to which the password is set is to be opened during the printing process.

SUMMARY

According to one aspect of the present invention, there is provided a file access control device included in a file management system having a storage unit which stores a file, the file access control device having an access control management unit that controls access to the storage unit or a file for which an access is requested while checking a file access right referring to access right information which is set for the storage unit and for each file stored in the storage unit, an access right setting processor that sets, when a file is to be read from the storage unit and transmitted in response to a file acquisition request when the access is permitted by the access control management unit, for the file to be transmitted, an access right based on an access right which is set for the storage unit and an access right which is set for the file, and adds access right information indicating the set access right to the file, and a transmission processor that transmits a file to which the access right information is added by the access right setting processor.

BRIEF DESCRIPTION OF THE DRAWINGS

These and other aspects of the disclosure will become apparent from the following description when read in conjunction with the accompanying drawings, wherein the same reference numerals have been applied to like parts and in which.

DETAILED DESCRIPTION

An exemplary embodiment of the present invention will now be described with reference to the drawings.

Figure 1:
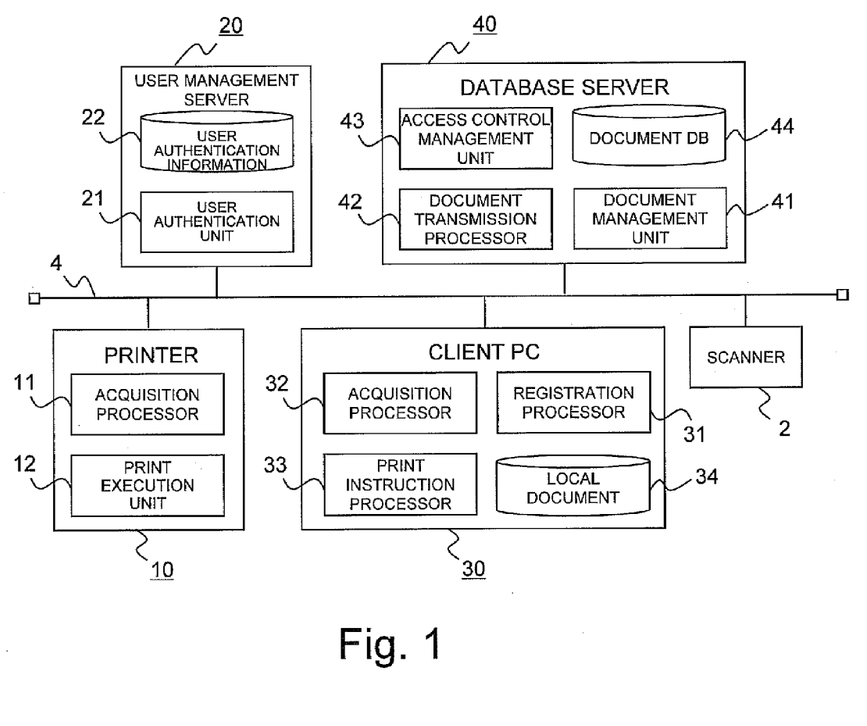
FIG. 1 is a structural block diagram showing an exemplary embodiment of a file management system according to the present invention.

FIG. 1 is a structural block diagram showing an exemplary embodiment of a file management system according to the present invention. FIG. 1 shows a scanner 2, a printer 10, a user management server 20, a client PC 30, and a database server 40, each of which is connected to a network 4. The scanner 2 is a device which reads a document to be printed. The printer 10 is a device which prints the document to be printed. As the printer 10 used in the exemplary embodiment, image forming devices such as a multifunction center equipped with a computer and having a high printing capability are considered. The printer 10 has an acquisition processor 11 and a print execution unit 12. The acquisition processor 11 acquires document data to be printed. When the acquisition processor 11 receives a printing instruction designating storage destination information (URL) instead of an actual file of a document, the acquisition processor 11 acquires the actual file referring to the storage destination information. In the exemplary embodiment, the database server 40 stores and manages the actual file. The print execution unit 12 forms a print image of document data acquired by the acquisition processor 11 according to a print attribute of the document file, and transfers the print image onto a print medium to execute the printing process. The constituent elements 11 and 12 in the printer 10 are realized through the cooperative action of a computer or a printing mechanism equipped in the printer 10 and a program executed on a CPU equipped in the computer.

The user management server 20 is a server computer for authenticating a user who uses the system, and has a user authentication unit 21 and a user authentication information storage 22. The user authentication information storage 22 stores user authentication information including a user ID and a password to be designated for logging in to the system, access right information including a user ID and a password to be designated for acquiring access permission to the database server 40 storing the document data used in the present system, and access right information including a user ID and a password to be designated for each user to acquire an access permission for document data stored in the database server 40. The user authentication unit 21 searches the user authentication information storage 22 in response to an inquiry transmitted from the database server 40 or the like including a user ID and a password, to authenticate the user. The user authentication unit 21 is realized by means of a computer equipped in the user management server 20 and a program which is executed on the CPU equipped in the computer. The user authentication information storage 22 is realized by an external storage device equipped in the user management server 20.

The client PC 30 is a personal computer (PC) used by a user who uses the document data, and has a registration processor 31, an acquisition processor 32, a print instruction processor 33, and a local document storage 34. The registration processor 31 registers the document data stored in the local document storage 34 in the database server 40. As will be described in detail later, various passwords can be set for the document data to be registered. The acquisition processor 32 acquires document data to be printed from the database server 40 in response to a request from a user. The print instruction processor 33 issues a printing instruction of a document to the printer 10. The constituent elements 31-33 in the client PC 30 are realized by means of a computer equipped in the client PC 30 and a program running on the CPU equipped in the computer. The local document storage 34 is realized by an external storage device equipped in the client PC 30.

The database server 40 is a server computer which stores and manages document data used in the present system. The data file to be stored is not limited to a document data file. However, in the exemplary embodiment, document data is described as a representative example of the data file for convenience because a printing process of a data file is being described. The database server 40 has a document management unit 41, a document transmission processor 42, an access control management unit 43, and a document database 44. The document management unit 41 manages a document using the document database 44 such as, for example, registering in the document database 44 a document transmitted in response to a registration request from the client PC 30. The document transmission processor 42 transmits document data to which access right information is added through a process, to be described later, in response to an acquisition request from the printer 10 or client PC 30, to the originator of the acquisition request. The access control management unit 43 controls access to the document database 44 and to the document stored in the document database 44. The document database 44 stores a data file to be handled by the present system. In general, in the data file, an access right (operation right) such as Read and Write is set as a file attribute. In the exemplary embodiment, access right information which includes a password which is set by a registration process to be described later is further set as a file attribute. In addition, access right information is registered in association with the data file in the document database 44. The constituent elements 41-43 in the database server 40 are realized by means of a computer equipped in the database server 40 and a program running on a CPU equipped in the computer. The document database 44 is realized by an external storage equipped in the database server 40.

The network 4 is shown as a LAN in FIG. 1. The present invention, however, is not limited to such a network configuration, and may include multiple LANs or a public network. In addition, in the exemplary embodiment, the scanner 2 and the printer 10 are shown as separate devices, but the present invention is not limited to such a configuration, and the scanner 2 and the printer 10 may be realized with an image forming device such as a multifunction center.

Next, an operation in the exemplary embodiment will be described. The flow of the basic process in the exemplary embodiment can be primarily divided into registration of a document in the database server 40 and acquisition of the document from the database server 40 for use of the document. First, the process of registering the document in the database server 40 executed by the client PC 30 will be described.

Figure 2:
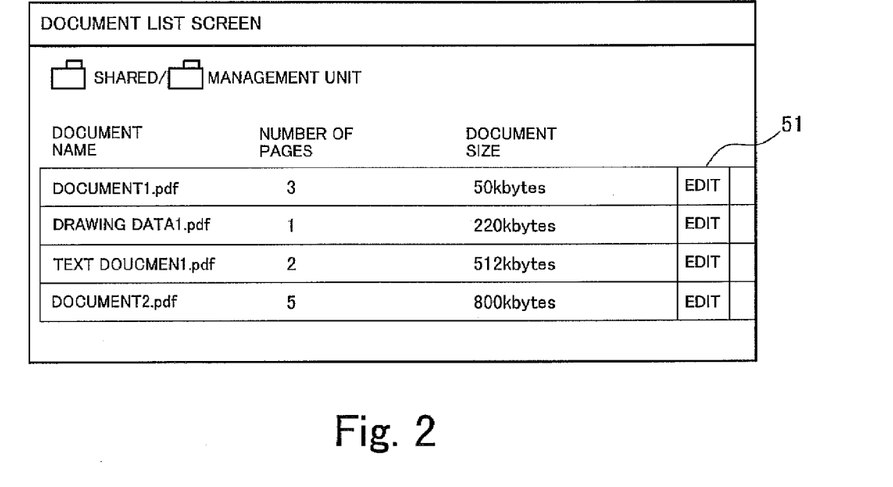
FIG. 2 is a diagram exemplifying a layout of a document list screen displayed on a screen of a client PC in an exemplary embodiment of the present invention.
Figure 3:
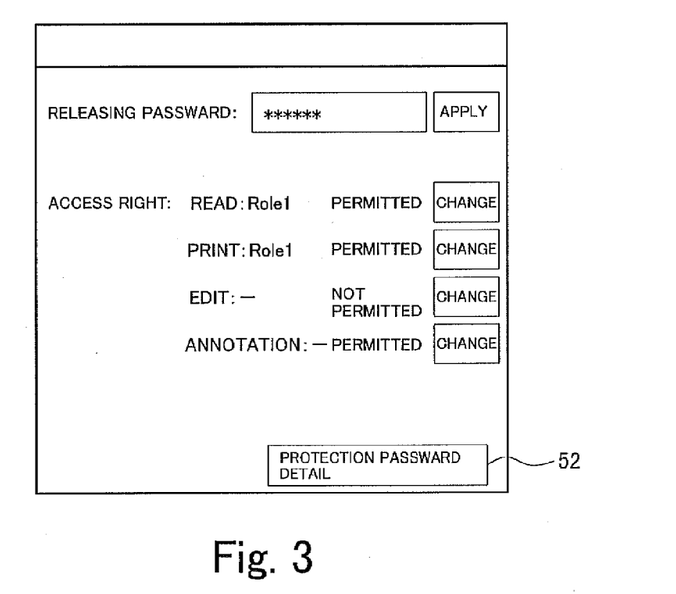
FIG. 3 is a diagram exemplifying a layout of an attribute editing screen displayed on a screen of a client PC in an exemplary embodiment of the present invention.

When a user of a client PC 30 executes a predetermined registration operation for a document, a program for the registration process is started and the registration processor 31 starts processing. FIG. 2 is a diagram exemplifying a layout of a document list screen displayed by the registration processor 31 on a display (not shown) of the client PC 30. The registration processor 31 first executes a process to display the document list screen. The user selects a document to be registered from among files read from the scanner 2 and files stored in the local document storage 34, and causes the document to be displayed on the document list screen. When a file attribute which is set for each document is still to be used, similar to the related art, a predetermined registration operation may be performed. When, on the other hand, it is desired to set a finer file attribute using characteristic functions in the exemplary embodiment, the user clicks on an edit button 51 displayed corresponding to the document. When a password is already set for the document file itself, a password input screen is displayed in response to the click operation to prompt input of a password necessary for operating on the document. The registration processor 31 analyzes the access right which is set for the document when a password is input and displays an attribute editing screen. FIG. 3 exemplifies a layout of the attribute editing screen. In the attribute editing screen, default values for operation rights (access rights) including read, print, edit, and annotation to be set for the document are displayed on the screen. The user changes the setting of the operation right as necessary.

When the password input by the user is identical to the password for full access which is set for the document, the attribute editing screen as described above is displayed, and editing of the operation right is enabled. When, on the other hand, the input password differs from the full access password or when the input password is a password which has been issued by the database server 40 in the past and added to the document, the edit button 51 is displayed in an unselectable form such as, for example, dimly displaying the edit button 51, so that the operation right cannot be edited.

Figure 4:
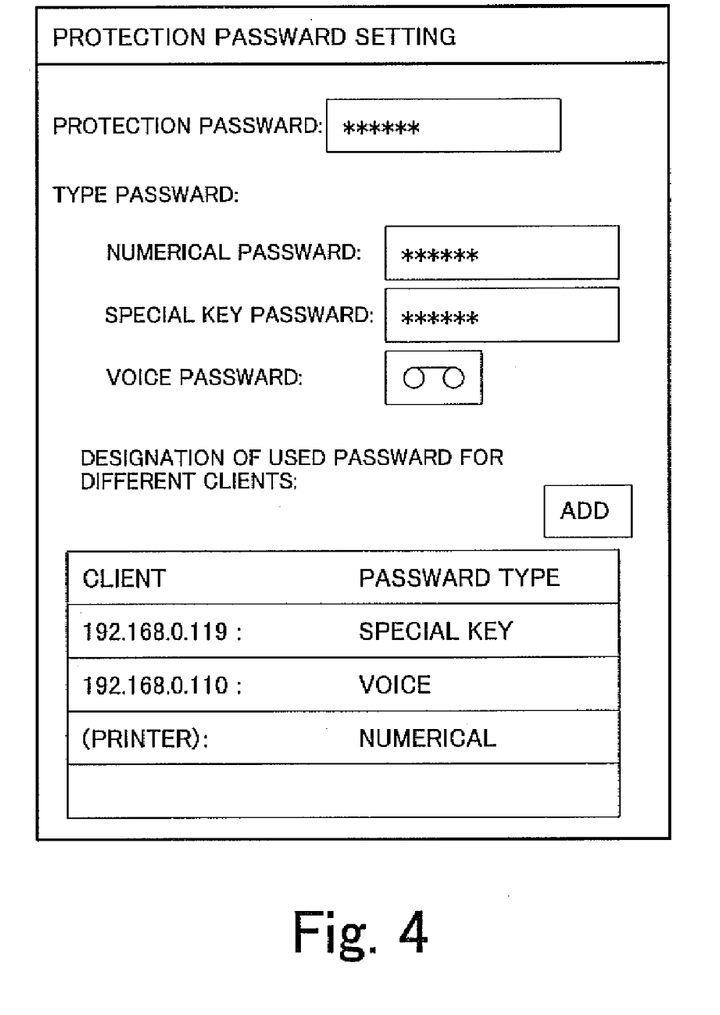
FIG. 4 is a diagram exemplifying a layout of a protection password setting screen displayed on a screen of a client PC in an exemplary embodiment of the present invention.

As shown in FIG. 3, a protection password detail button 52 is provided in the attribute editing screen. FIG. 4 exemplifies a protection password setting screen which is displayed on the screen when the protection password detail button 52 is clicked. In the exemplary embodiment, as is clear from FIG. 4, multiple passwords of different attributes can be set for each document in order to permit access to the document. In the exemplary embodiment, in addition to the protection password which is common to all attributes of the document, passwords using numbers, special keys, and voice can be set as passwords (password type) of different attributes, as shown in FIG. 4. Of these passwords, the numerical password is a password which only includes numbers. For example, on an operation panel of a typical printer 10, no key button for alphabetic characters are provided and only numerical key buttons used, for example, for inputting and designating a number of copies are provided. The password is formed with a string of numbers in order to allow input of the proper password by simply operating the numerical keypads in such a device. The special key password is a password which includes a special key. For example, a typical PDA is provided with various special key buttons, and thus the password is formed including the special characters in order to allow easy input of a proper password from such a device. The special key password is input as a hexadecimal number (for example, 56AF9B) representing a combination of binary data which can be acquired as input information when the special key buttons of the input device are pressed. The voice password is a password that is audio. For example, the password is formed by recording sound to allow easy input of password from a device which can input sound such as, for example, a portable phone. In other words, the user authentication is performed through voice authentication using a voice recognition function.

In addition, the designation of which password is to be used for user authentication can be made for each client, from the protection password setting screen. According to the setting example shown in FIG. 4, it can be understood that a special key password is used for user authentication of a device having a communication function (PDA or the like) to which an IP address of "192.168.0.119" is assigned. For devices that are not set in the column of the used password designation for each client, the user authentication is performed using password protection.

When information related to the access right including the password is set for each document data to be stored and managed by the database server 40, the registration processor 31 associates the access right information with each document, inserts the access right information in the registration request, and transmits the registration request to the database server 40.

When the database server 40 receives the registration request transmitted form the client PC 30, the document management unit 41 registers the document included in the registration request in the document database 44 and transmits the access right information to the user management server 20. The user management server 20 registers the received access right information in the user authentication information storage 22. The document stored and managed by the database server 40 and the access right information of the document stored and managed by the user management server 20 are managed in association with each other.

In the exemplary embodiment, the document data to be registered is registered in the document database 44 in this manner, and a more detailed setting of the access right for each document is possible.

Figure 5:
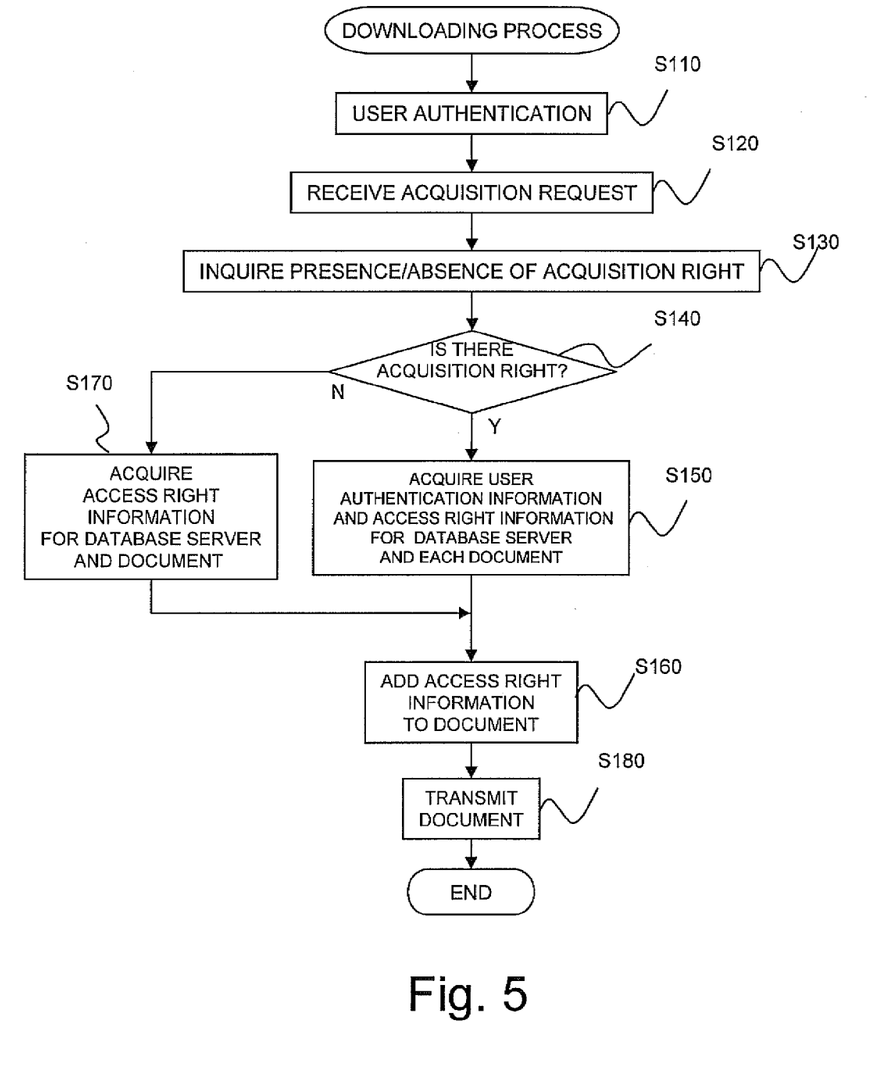
FIG. 5 is a flowchart showing a downloading process executed by a database server in an exemplary embodiment of the present invention.
Figure 6:
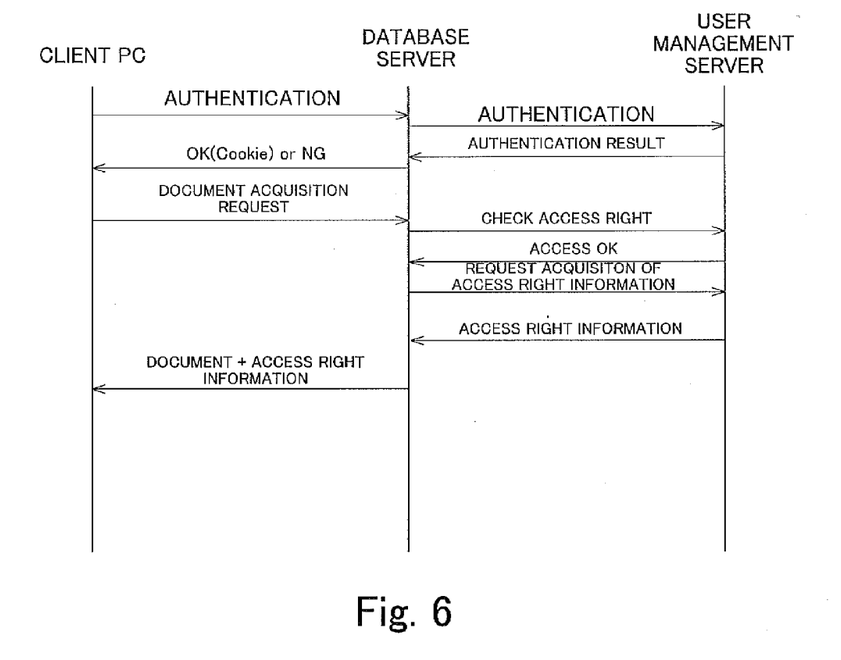
FIG. 6 is a diagram showing a flow of data in a downloading process in an exemplary embodiment of the present invention.

Next, a process to acquire a document from the database server 40 for use of the document will be described. As described above, access rights can be finely set such as, for example, various password settings for the document to be stored and managed by the database server 40, which allows for comprehensive security measures. When the document is downloaded, in general, an access right which is set to the download and storage destination (disk, folder, etc.) is added to the downloaded copy document. With this configuration, even when an operation right such as write prohibition or an access right such as a password has been set in the database server 40, the security of the document cannot be maintained due to the downloading process. In consideration of this, in the exemplary embodiment, an access right similar to the document stored and managed by the database server 40 is maintained in the copy destination of the document through the following process. FIG. 5 is a diagram showing a flow of data in the present system and FIG. 6 is a flowchart showing a process in the database server 40 which provides a document in response to a request from the client PC 30. The use of a document in the exemplary embodiment will now be described exemplifying a process in which the client PC 30 acquires, collectively and through downloading, multiple documents stored and managed by the database server 40, with reference to the drawings.

First, user authentication with respect to the database server 40 is performed through the following processes (step 110). When a user who has logged in the system from the client PC 30 inputs a user ID and a password through a predetermined input screen, the client PC 30 transmits the input user ID and password to the database server 40, and requests a user authentication.

When the access control management unit 43 in the database server 40 receives the user authentication request transmitted from the client PC 30, the access control management unit 43 transmits the user ID and the password included in the request to the user management server 20. The user authentication unit 21 in the user management server 20 matches the user ID and the password received from the database server 40 with access right information related to the database server 40, and returns the authentication result to the database server 40.

When the access control management unit 43 in the database server 40 confirms that the authentication is successful, the access control management unit 43 transmits a response to the client PC 30 indicating that the access to the database server 40 is permitted, along with cookie information. When, on the other hand, authentication is unsuccessful, the access control management unit 43 transmits a response to the client PC 30 indicating that the authentication is unsuccessful, and prompts re-input of the user ID and the password for logging in.

Figure 7:
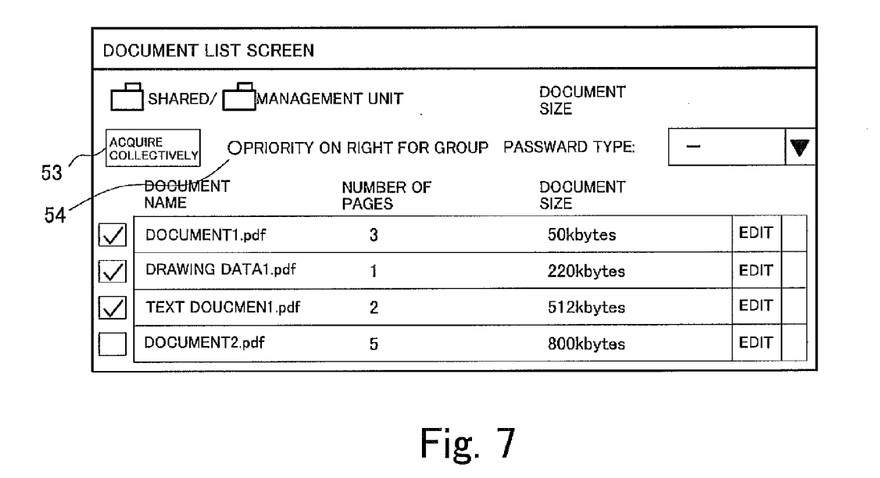
FIG. 7 is a diagram exemplifying a layout of a document list screen displayed on a screen of a client PC in an exemplary embodiment of the present invention.

When a user for whom authentication is successful executes a predetermined operation to display a document list, a program for an acquisition process is started and the acquisition processor 32 starts the process. FIG. 7 is a diagram exemplifying a layout of a document list screen to be displayed on the display (not shown) of the client PC 30 by the acquisition processor 32. The acquisition processor 32 first acquires, from the database server 40, attribute information necessary for displaying the document to be displayed, on the screen, specifically, in the example of FIG. 7, the attribute information related to the document name, number of pages, and document size, and incorporates and displays the information in the document list screen. FIG. 7 shows an example in which PDF files of "Document1", "Drawing Data1", and "Test Document" are selected from among the documents displayed in the list, as the check box for these documents are checked. When the user clicks on the "acquire collectively" button 53 on the document list screen, the acquisition processor 32 transmits the acquisition request including the document name or the like for identifying the designated document to the database server 40.

When the database server 40 receives the acquisition request transmitted from the client PC 30 (step 120), the access control management unit 43 transmits the document name and the requesting user ID included in the acquisition request to the user management server 20 to inquire whether or not a user identified by the user ID has an acquisition right for the document data file identified by the document name (step 130). The user authentication unit 21 in the user management server 20 refers to the access right information of the document data file identified by the document name transmitted from the database server 40 and returns presence/absence of the acquisition right of the user to the database server 40.

When it is determined that the user has the acquisition right (Y in step 140), the access control management unit 43 in the database server 40 then transmits an acquisition request to the user management server 20, to acquire user authentication information of the user and the access right information of the database server 40 and the document (step 150). In general, the password of a user is registered in the user authentication information storage 22 in an encrypted form. In the exemplary embodiment, because the password is generated through reversible encryption, the user management server 20 decodes the password and transmits the password to the database server 40. Similar processes apply for other passwords such as the passwords for groups and roles. Here, it is assumed that a secure communication method using SSL is used between the computers, and measures are taken against the threat of tapping or the like. The access control management unit 43 sets the password of the user acquired from the user management server 20 as an "opening password" of the document and adds the password as the access right information of the document along with the acquired access right information (step 160).

When, on the other hand, the user management server 20 determines that the user does not have the acquisition right (N in step 140), the access control management unit 43 then transmits an acquisition request to the user management server 20, to acquire the access right information of the database server 40 and the document (step 170). Then, the password for permitting access to the database server included in the access right information of the database server 40 is set as the "opening password" of the document and the password is added as the access right information of the document along with the acquired access right information (step 160). The document transmission processor 42 transmits the document to which the access right information is added to the client PC 30 which requested the acquisition (step 180).

The above-described process is repeatedly executed with respect to each document file selected in the document list screen shown in FIG. 7.

In this manner, the acquisition processor 32 in the client PC 30 can acquire, from the database server 40 and collectively, the documents selected by the user through downloading.

The documents acquired by the client PC 30 with this process are assigned access rights similar to those when the documents are managed by the database server 40. In other words, the owner of the document can be identified from the user ID which is set as the owner in the document attribute information, and when the user ID of the document owner matches the user ID of the user sending the acquisition request, because the password of the user is set as the "opening password" of the document, security similar to that when the document is managed in the database server 40 can be maintained for a copied document which is localized through downloading. When, on the other hand, the document owner is not identical to the user who sent the acquisition request, because the password for accessing the database server is set as the "opening password" of the document, in this case also, security at the same level as that when the document is managed in the database server 40 can be maintained for the copied document which is localized through downloading.

In the above description, a case is described in which the password of the user sending the acquisition request is used as the "opening password". When a "priority on right for group" button 54 shown in FIG. 7 is checked, the password of the group for which the operation to the document is permitted is added to the document without using the password of the user. With this process, circulation, review, etc. of the document within the group can be smoothly promoted.

Next, a process when a document is printed will be described as an example use of a document stored in the database server 40. First, a case in which the client PC 30 issues a printing instruction to the printer 10 for the printing process will be described.

Figure 8:
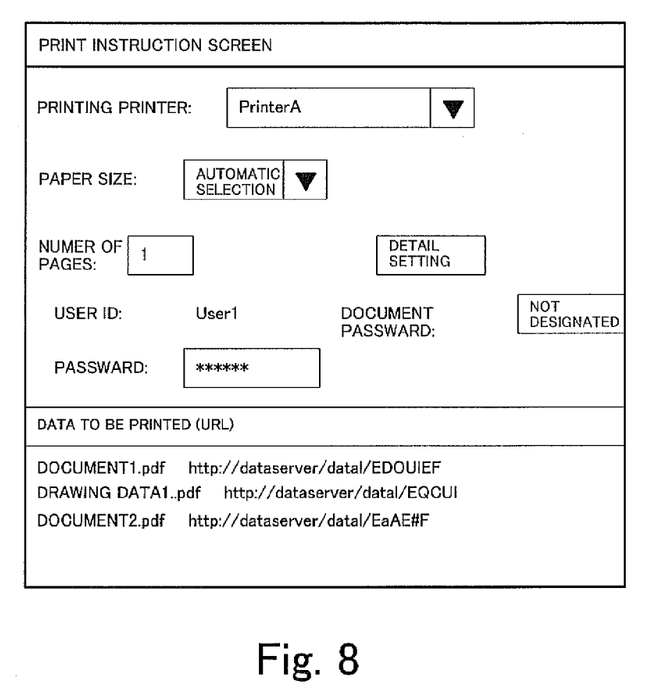
FIG. 8 is a diagram exemplifying a layout of a print instruction screen displayed on a screen of a client PC according to an exemplary embodiment of the present invention.

When a user of the client PC 30 performs a predetermined print instruction operation, a program for processing printing instruction is started, and the printing instruction processor 33 starts processing. FIG. 8 is a diagram exemplifying a layout of a print instruction screen displayed on the display of the client PC 30 by the print instruction processor 33. The print instruction processor 33 first executes the process to display the print instruction screen. The user inputs and designates the user ID and the password of the database server 40 which stores the document to be printed, in addition to the predetermined input items such as the printer to which the print instruction is to be sent from the print instruction screen, paper size, number of printed copies, etc. In addition, the user selects documents to be printed from among the documents stored in the database server 40. In FIG. 8, a case is exemplified in which printing of three document data is requested. After the user authentication using a password which has been input and designated, the print instruction processor 33 acquires, from the database server 40, the location information of the selected document (URL), and displays the location information on the screen. Then, according to a print instruction by the user, the print instruction processor 33 adds the user authentication information, log-in information of the database server 40 (user ID and password), and location information (URL) of print data as the data to be printed, into the print instruction information and issues a print request to the printer 10.

When the printer 10 receives the print request from the client PC 30, the printer 10 temporarily stores the contents of the print request and transmits a response indicating the reception completion of the print request to the client PC 30 along with a job ID. Then, after access by the acquisition processor 11 in the printer 10 to the database 40 is permitted with the received log-in information, the acquisition processor 11 acquires the document data to be printed from the database server 40. This process is identical to the downloading process applied by the client PC 30. Specifically, when the document acquisition request including the log-in information of the database server 40 is sent to the database server 40, the database server 40 cooperates with the user management server 20 to authenticate the user, and when the authentication is successful, the database server 40 transmits a response to the printer 10 indicating that the authentication is successful, along with the cookie information. When the log-in is unsuccessful, on the other hand, the database server 40 transmits a response indicating that the authentication is unsuccessful, and the printer 10 completes the printing process.

When the authentication in successful, the database server 40 acquires the password of the user from the user management server 20 through a process similar to the above, adds the password to the document along with the access right information of the document, and downloads the document to the printer 10.

When the print execution unit 12 of the printer 10 acquires the document to be printed in this manner, the print execution unit 12 executes the printing process by forming a print image based on the acquired document data and transferring the print image onto a print medium. In this process, because the downloaded data is protected with the password of the user, the document can be opened using the password of the user stored when the previous print request is received. With this process, the printer 10 can perform the printing process without requiring the user to input a password, and thus, the printer 10 can execute the printing process without a problem even in the case of printing collectively or batch printing in which multiple documents are printed collectively, as in the example case.

However, with the above-described process, because the printer 10 executes the acquisition process of the document data, the load on the printer 10 may become significant. In consideration of such a case, a configuration will now be described in which the client PC 30 acquires, from the database server 40 and collectively the document data to be printed, and transmits the document data to the printer 10, to issue the print instruction.

The process for the client PC 30 to acquire the document data to be printed from the database server 40 is identical to the process when the document data is downloaded using the document list screen shown in FIG. 7, and thus will not be described again. Then, the acquired document may be sent to the printer 10 for printing. Unlike the above-described print instruction process in which the location information of the document data is sent to the printer 10, here, the user authentication information of the user using the client PC 30 such as the password of the user is not sent. With this configuration, input of the password is required in order to print a document to which the "opening password" is set. The user may input the password through the operation panel of the printer 10 in response to the input request, to print the document.

However, because in general no operation keys for alphabetic characters are provided on the operation panel of the printer 10, if the password to be input includes alphabetic characters, the document cannot be printed, or alternatively, a very complex key operation would be required.

Figure 9:
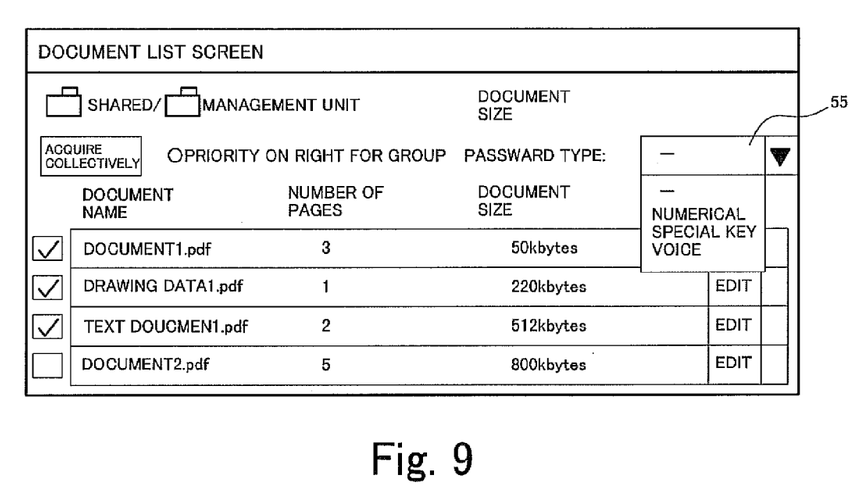
FIG. 9 is a diagram exemplifying a layout of a document list screen displayed on a screen of a client PC in an exemplary embodiment of the present invention.

In consideration of this, the exemplary embodiment is configured so that the attribute type of the password can be selected by the user. FIG. 9 shows a document list screen identical to that of FIG. 7, except that a type password that can be set according to a predetermined user operation in FIG. 4 is displayed in a list in a setting field 55 of the password type on the screen. Therefore, the user can select an appropriate type password from among the type passwords displayed in the list. In this example case, because the printer 10 having a numerical keypad opens the document, it is convenient for the user to select a numerical password.

When the user applies a predetermined print instruction operation after selecting an appropriate type of password for the device which uses the document in this manner, the print instruction processor 33 requests the printer 10 to print, by transmitting the document data to be printed along with the selected password type.

When the printer 10 receives the print request from the client PC 30, the printer 10 temporarily stores the content of the print request, and transmits a response indicating completion of reception of the print request to the client PC 30, along with a job ID. Then, the print execution unit 12 of the printer 10 executes the printing process by forming a print image from the acquired document data and transferring the print image onto a print medium. In this configuration, however, because the document data to be printed is protected by a numerical password, the password must be input. Therefore, when the print execution unit 12 determines that the password must be input, the print execution unit 12 displays a message on the operation panel to prompt input of password. The user inputs the password in response to the displayed message. Because the password to be input is a numerical password, the password can be easily input from the operation panel. The print execution unit 12 compares and matches the numerical password received from the client PC 30 and the password input through the operation on the operation panel, and when the passwords match, the document can be opened, and thus the document can be normally printed. If, on the other hand, the passwords do not match, input of the password is again prompted. When the document cannot be opened with the re-input password, a print error occurs and the process proceeds to a next printing process such as, for example, printing of a next document.

According to the exemplary embodiment, because a password of an appropriate type can be selected according to the interface of the device which uses the document, the user can easily input the password.

According to the exemplary embodiment, the access right for each document file is set based on a content set by the client PC 30 which sends the registration request for the document. Alternatively, it is also possible to provide, for example, a unit that changes the contents of the access right setting information registered in the database server 40 or user management server 20, to allow updating of the setting. With this structure, it is possible to realize more appropriate security management for document files.

In the above description, the access right to be set on a document file to be downloaded is automatically determined according to the registered access right setting information. The present invention, however, is not limited to such a configuration, and the access right can be set in which the registered setting is further limited. As a copy of a document file is stored outside of the database server 40 even though a password is set, the ability to weaken the access right is convenient for strengthening the security.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. A file access control device included in a file management system comprising a storage unit which stores a file, the file access control device comprising:

an access control management unit to control access to the storage unit or a file stored in the storage unit by referring to access right information which is set for the storage unit and for each file stored in the storage unit;

an access right setting processor to add to a file access right information, the access right information including a first access right based on an access right which is set for the storage unit and a second access right based on an access right which is set for the file, wherein the file is to be read from the storage unit and transmitted in response to a file acquisition request and access to the file is permitted by the access control management unit; and a transmission processor to transmit the file, wherein the first access right and the second access right were added to the transmitted file by the access right setting processor.

2. The file access control device according to claim 1, wherein the access right information added to the file to be transmitted contains a password for permitting access to the file.

3. The file access control device according to claim 2, wherein the password included in the access right information is a password for permitting access which is set for the storage unit.

4. The file access control device according to claim 2, wherein the password included in the access right information is a password for permitting access which is set for the file.

5. The file access control device according to claim 2, wherein when a password common to group members is set for the file to be transmitted, the password included in the access right information is a password which is common to the group members.

6. The file access control device according to claim 1, further comprising:
an input processor that inputs an access right to be set for the file to be transmitted, wherein the access right setting processor adds, to the file to be transmitted, access right information according to the input access right in place of the access right based on the first access right which is set for the storage unit and the second access right which is set for the file.

7. The file access control device according to claim 1, wherein the access right setting processor sets, in the file, an access right which is further limited compared to the first access right which is set for the storage unit and the second access right which is set for the file.

8. A file access control method in a file management system including a file management server which stores and manages a file and a client which uses a file, the method comprising:
registering, in a storage unit and in response to a received registration request, a file included in the registration request and information related to an access right for the file, in association with each other;
adding to the file a first access right based on an access right which is set for the storage unit and a second access right based upon an access right which is set for the file, wherein the file is to be read from the storage unit and transmitted in response to a file acquisition request and access to the file is permitted; and transmitting the file, wherein the first access right and the second access right were added to the transmitted file.

9. A computer readable recording medium storing a program executed by a file access control device, included in a file management system having a storage unit which stores a file, the executed program performs the steps comprising:
controlling of access to a storage unit or of a file stored in the storage unit by referring to access right information which is set for the storage unit and for each file stored in the storage unit;
adding to the file a first access right based on an access right which is set for the storage unit and a second access right based upon an access right which is set for the file, wherein the file is to be read from the storage unit and transmitted in response to a file acquisition request and access to the file is permitted; and
transmitting the file, wherein the first access right and the second access right were added to the transmitted file.

* * * * *